United States Patent
Gupta et al.

(10) Patent No.: US 11,830,401 B2
(45) Date of Patent: Nov. 28, 2023

(54) ALIGNMENT OF MODIFICATION REGIONS WITH PIXEL REGISTRATION

(71) Applicant: Microsoft Technology Licensing, LLC, Redmond, WA (US)

(72) Inventors: Vasudha Gupta, Fremont, CA (US); Matthew D. Morris, Seattle, WA (US); Rajesh Manohar Dighde, Redmond, WA (US); Camilo Leon, Redmond, WA (US); Marko Kullervo Heikkinen, Redmond, WA (US); Linghui Rao, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/906,284

(22) PCT Filed: Mar. 17, 2021

(86) PCT No.: PCT/US2021/022686
§ 371 (c)(1),
(2) Date: Sep. 14, 2022

(87) PCT Pub. No.: WO2021/194815
PCT Pub. Date: Sep. 30, 2021

(65) Prior Publication Data
US 2023/0099088 A1    Mar. 30, 2023

(30) Foreign Application Priority Data
Mar. 24, 2020    (NL) ...................................... 2025203

(51) Int. Cl.
*G09G 3/20*    (2006.01)
*G06F 3/14*    (2006.01)

(52) U.S. Cl.
CPC ............. *G09G 3/20* (2013.01); *G06F 3/1423* (2013.01); *G06F 3/1446* (2013.01);
(Continued)

(58) Field of Classification Search
CPC ............... G09G 3/20; G09G 2300/026; G09G 2320/08; G09G 2356/00; G09G 2360/04;
(Continued)

(56) References Cited

U.S. PATENT DOCUMENTS 5,745,097 A    4/1998  Cappels
6,456,339 B1    9/2002  Surati et al.
(Continued)

FOREIGN PATENT DOCUMENTS

WO    2014153964 A1    10/2014
WO    2020096801 A2    5/2020

OTHER PUBLICATIONS

"How to Handle Safe Area Insets, Notch & Display Cutout for iPhone X, iPad X and Android P—2019", Retrieved from: https://web.archive.org/web/20190320183853/https:/felgo.com/cross-platform-app-development/notch-developer-guide-ios-android, Mar. 20, 2019, 17 Pages.

(Continued)

*Primary Examiner* — Vijay Shankar
(74) *Attorney, Agent, or Firm* — Alleman Hall Creasman & Tuttle LLP

(57) ABSTRACT

Examples are disclosed herein that relate to displaying modification regions on a multi-display device. One example provides a multi-display device comprising a plurality of displays, the multi-display device storing line offset data defining a line offset to apply to a displayed image to correct for display misalignment, and modification region data defining one or more modification regions that each modifies an appearance of the displayed image. The multi-display device is configured to set a displayed location of a first active area based upon the line offset data for a first display, and set a displayed location of a first modification region for the first display based upon the line offset data for the first display.

20 Claims, 12 Drawing Sheets

(52) U.S. Cl.
CPC ... *G09G 2300/026* (2013.01); *G09G 2320/08* (2013.01); *G09G 2356/00* (2013.01); *G09G 2360/04* (2013.01)

(58) Field of Classification Search
CPC .. G09G 2320/06; G06F 3/1423; G06F 3/1446
See application file for complete search history.

(56) References Cited

U.S. PATENT DOCUMENTS

| | | | |
|---|---|---|---|
| 8,253,883 B2 | 8/2012 | Mimura | |
| 9,965,995 B2 * | 5/2018 | Chen | G09G 3/2092 |
| 10,283,062 B2 | 5/2019 | Jin et al. | |
| 10,354,569 B2 * | 7/2019 | Choi | G06F 3/1431 |
| 10,409,118 B1 | 9/2019 | Chang et al. | |
| 11,482,176 B2 * | 10/2022 | Kim | G09G 3/00 |
| 2010/0201604 A1 | 8/2010 | Kee et al. | |
| 2016/0351107 A1 | 12/2016 | Chen et al. | |
| 2017/0249905 A1 | 8/2017 | Kim et al. | |
| 2018/0226005 A1 | 8/2018 | Choi et al. | |

OTHER PUBLICATIONS

"Support display cutouts", Retrieved from: https://web.archive.org/web/20190729055805/https:/developer.android.com/guide/topics/display-cutout/, Jul. 29, 2019, 12 Pages.

"Search Report Issued in Netherlands Patent Application No. N2025203", dated Dec. 9, 2020, 10 Pages.

"International Search Report and Written Opinion Issued in PCT Application No. PCT/US21/022686", dated Jun. 22, 2021, 11 Pages.

* cited by examiner

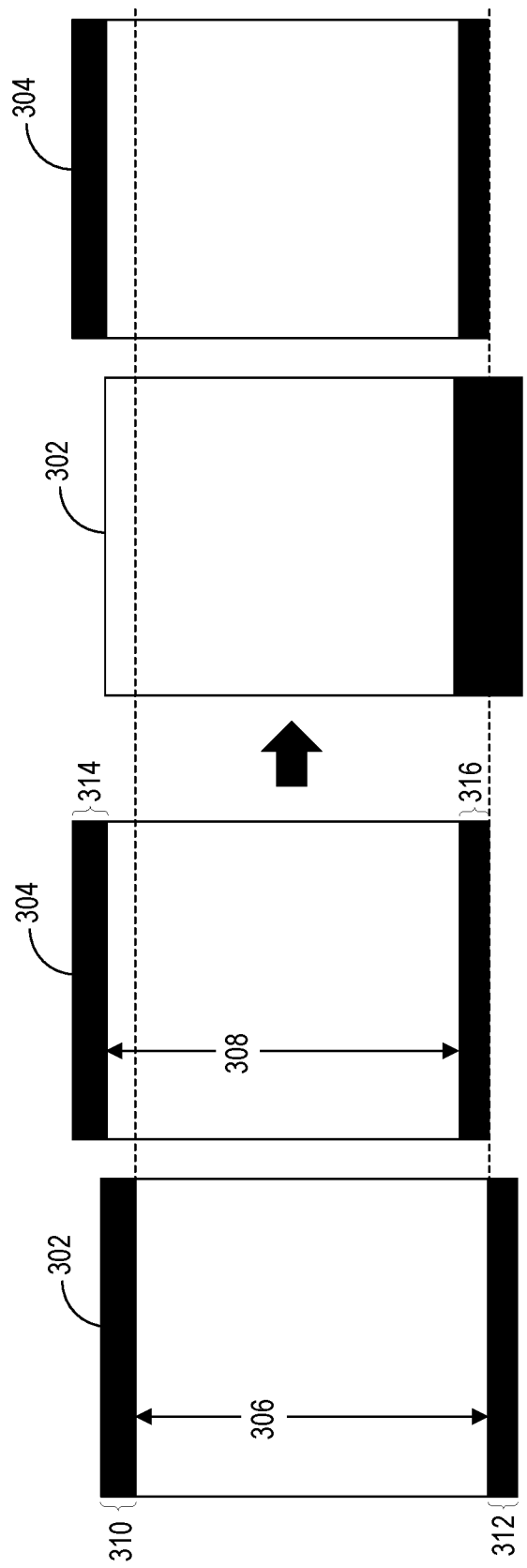

1302

100 US 11,830,401 B2

ALIGNMENT OF MODIFICATION REGIONS WITH PIXEL REGISTRATION

CROSS REFERENCE TO RELATED APPLICATIONS

The present application is a U.S. National Phase of International Patent Application Serial No. PCT/US2021/022686 entitled "ALIGNMENT OF MODIFICATION REGIONS WITH PIXEL REGISTRATION", filed Mar. 17, 2021 which claims priority to Netherlands Patent Application Serial No. 2025203, filed Mar. 24, 2020.

BACKGROUND

Some mobile electronic devices, such as smart phones and tablets, have a monolithic handheld form in which a display occupies substantially an entire front side of the device. Other devices, such as laptop computers, include a hinge that connects a display to other hardware, such as a keyboard and cursor controller (e.g. a track pad).

SUMMARY

Examples are disclosed herein that relate to aligning modification regions in accordance with pixel registration between displays on a multi-display device. One disclosed example provides a multi-display device comprising a plurality of displays, one or more processors, and one or more storage devices. The one or more storage devices store line offset data defining, for each of one or more displays of the plurality of displays, a line offset to apply to a displayed image to correct for display misalignment, and also store modification region data defining one or more modification regions that each modifies an appearance of a corresponding portion of the displayed image. Further, the one or more storage devices store instructions that are executable by the one or more processors to determine a line start position for a first active area based upon line offset data for a first display, set a displayed location of the first active area based upon the line offset data for the first display such that a first line of the first active area starts at the line start position, and set a displayed location of a first modification region for the first display based upon the line offset data for the first display.

Accordingly there is provided a multi-display device as defined in each of the independent claims. A method per the independent method claim is also provided. Advantageous features are defined in the dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A shows a schematic depiction of an example of a dual-display display device having displays that are misaligned.

FIG. 3B shows the displays of the example device of FIG. 3A in alignment after performing pixel registration.

DETAILED DESCRIPTION

Multi-display devices may provide for various use scenarios beyond those available on single-display devices. For example, a multi-display device may enable running two applications on separate displays, such as sharing a presentation on one display, while participating in a video conference on another display. Such functions may be useful for hand-held portable display devices, where the size of one display may not provide enough space to display more than one application window without compromising legibility of the application content. Likewise, a single image may be expanded and displayed concurrently across multiple displays, thereby enlarging the view of the image.

Figure 1:
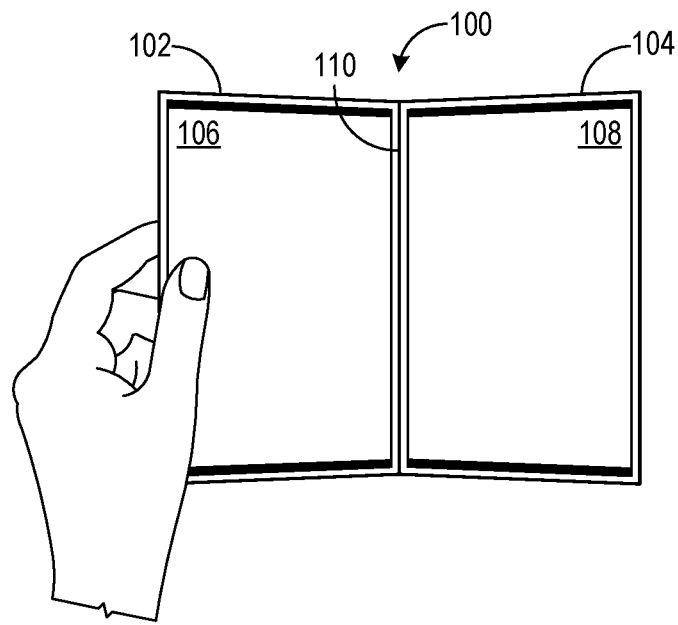
FIG. 1 shows an example multi-display computing device comprising two displays.

FIG. 1 shows an example multi-display computing device in the form of a dual-display device 100. The dual-display device 100 includes a first portion 102 and a second portion 104 that respectively include a first display 106 and a second display 108. A hinge 110 arranged between the first and second portions 102 and 104 enables the relative pose between the first portion 102 and the second portion 104 to be adjusted. The dual-display device 100 may be configured to determine the relative pose between the first and second portions 102 and 104 (e.g. via motion sensor data from one or more motion sensors in each portion, or via other suitable sensor(s))), and adjust a function of the computing device based on the relative pose. The dual-display device 100 may assume any suitable form, including but not limited to those of various mobile devices (e.g., a foldable smart phone, tablet, or laptop).

In the example of FIG. 1, the first display 106 and the second display 108 may be able to close both inwardly and outwardly relative to one another via hinge 110. In some such examples, the hinge 110 provides a full 360 degrees range of motion for each display. In other examples, the first and second displays may fold only inwardly, or only outwardly, thereby providing 180 degrees of motion, or any other suitable range of motion.

Figure 2:
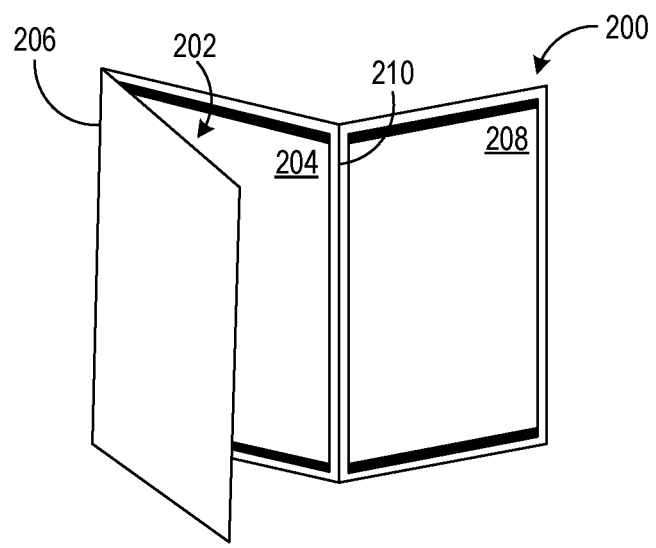
FIG. 2 shows an example multi-display computing device comprising three displays.

A multi-display device may have more than two displays in some examples. FIG. 2 shows an example multi-display computing device 200 comprising three displays, with first display 202 and second display 204 facing inwardly relative to hinge 206, and second display 204 and third display 208 facing outwardly relative to hinge 210.

Tolerances and manufacturing variances may lead to misalignments between displays of some multi-display devices in a population of devices. If not mitigated, images displayed on each display may appear to be slightly shifted in position relative to one another. As such, a single image displayed across the multiple displays may appear discontinuous.

To correct for display misalignment, a pixel registration process may be used at the time of manufacturing. Pixel registration involves adjusting a line start position of each of one or more displays of a multi-display device to drive an image signal at a modified line start position. Where misalignment is vertical (e.g. two horizontally-adjacent displays are misaligned in a vertical direction), the line start position for each of one or multiple displays may be adjusted in a vertical direction to align the images displayed on the displays. Horizontal misalignments may be similarly adjusted. To allow for pixel registration to be performed, a buffer zone of one or more lines of pixels of a display may be provided (such that the display has a larger number of lines of pixels than those used for image display), thereby providing a number of different line start positions for the display. In one example, buffer zones comprising two lines of pixels in each adjustment direction may be provided.

While pixel registration may correct for misalignment of lines of pixels, pixel registration also may result in the misalignment of pixel modification regions that are applied to a displayed image separately from the line start position. For example, display devices may be configured to display images as having curved or rounded corners, and/or as having other shapes applied to a perimeter or interior portion of a displayed image (e.g. a notch or opening to accommodate a camera). Such shapes may be implemented using hardware or programming. A hardware implementation may use a display having a backplane with rounded corners, wherein the pixels on the display panel are progressively smaller in the corners to create a rounded appearance at the corners. Likewise, a display driver (or other device) may include stored definitions of modification regions that define how to display certain pixels (e.g. at a reduced brightness, or with no illumination).

Modification regions may be implemented independently of line start position in multi-display devices. As such, pixel registration may result in a rounded corner or other modification region being misaligned with the edges of a displayed image. Accordingly, examples are disclosed herein that relate to aligning modification regions in accordance with pixel registration by utilizing line offset data to adjust a displayed location of a modification region when displaying an image. FIG. 3A shows a schematic depiction of an example dual-display display device 300 having a first display 302 and a second display 304 that are misaligned, and FIG. 3B shows the displays in alignment after performing a pixel registration process. The misalignment is shown schematically and exaggerated for the purposes of clarity. The misalignment may be understood in terms of an active area 306 of the first display 302 being misaligned with an active area 308 of the second display 304, and may arise due to mechanical or manufacturing tolerances, as examples. As a result of misalignment, corresponding rows of pixels between the two adjacent displays are offset from each other.

As mentioned above, to allow pixel registration to be performed, a buffer of unused lines of pixels may be provided at one or more edges of a display. In FIG. 3A, each display has such a buffer zone at a top and at a bottom of the display (with reference to the orientation shown in FIG. 3), as shown at 310, 312, 314, and 316. In other examples, displays may alternatively or additionally comprise buffer zones of one or more unused lines of pixels at each of one or more lateral sides (with reference to the orientation of FIG. 3). The term "lines of pixels" refers to vertical columns or horizontal rows of pixels.

Referring to FIG. 3, an active area 306 of the first display 302, which comprises the pixels used to display images, is misaligned with an active area 308 of the second display 304 due to the first display 302 and the second display 304 being physically misaligned. As a result, an image that is displayed across the active areas of the first display 302 and the second display 304 will be misaligned.

As it may be difficult to physically move the displays relative to each other to bring the displays into alignment during manufacturing, pixel registration may be used shift the relative positions of the first active area 306 and second active area 308. Pixel registration may be performed, for example, by displaying a known calibration image across multiple displays, such as an image with one or more straight lines that extend across the multiple displays and that will appear contiguous when the displays are aligned. When the displays are not aligned, the line start position of each of one or more of the displays may be adjusted until the displayed calibration image appears contiguous. In FIG. 3B, the line start position of first display 302 is moved upwardly, but in other examples the adjustment may be achieved by moving the line start position of display 304 downwardly, or moving the line start positions of both displays. The resulting line start position for each display is stored as line offset data, and is used to position displayed images on the display during ordinary use. In some examples, the line offset data may be adjusted during the lifetime of a device, such as after a predetermined amount of time, in response to a user input, and/or after the device experiences physical damage.

Figure 4C:
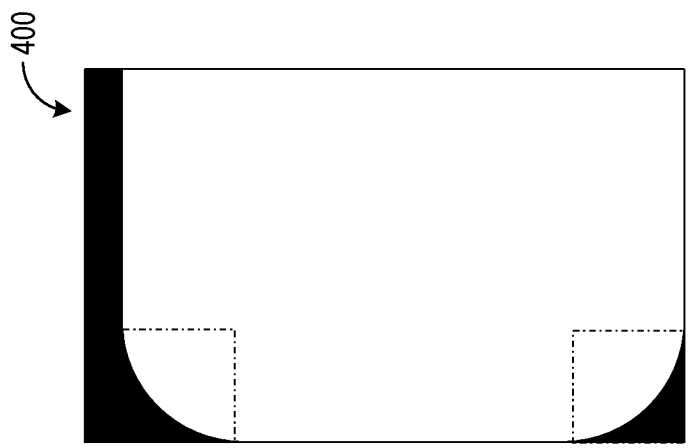
FIGS. 4A-4C show example modification regions that define rounded corners for two corners of a display, and illustrate alignment of the modification regions in accordance with pixel registration.
Figure 4B:
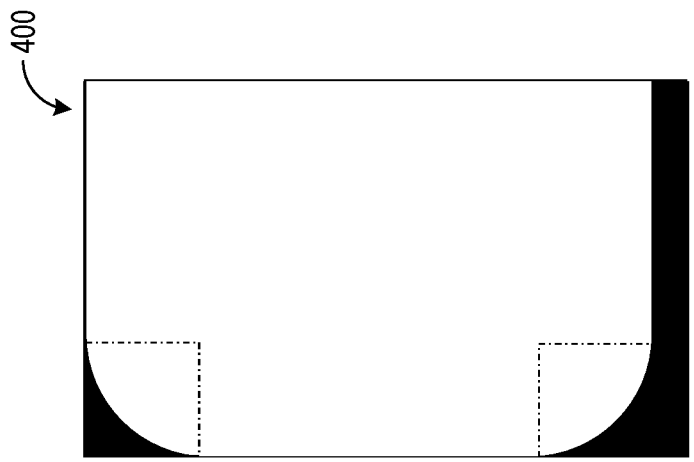
Figure 4A:
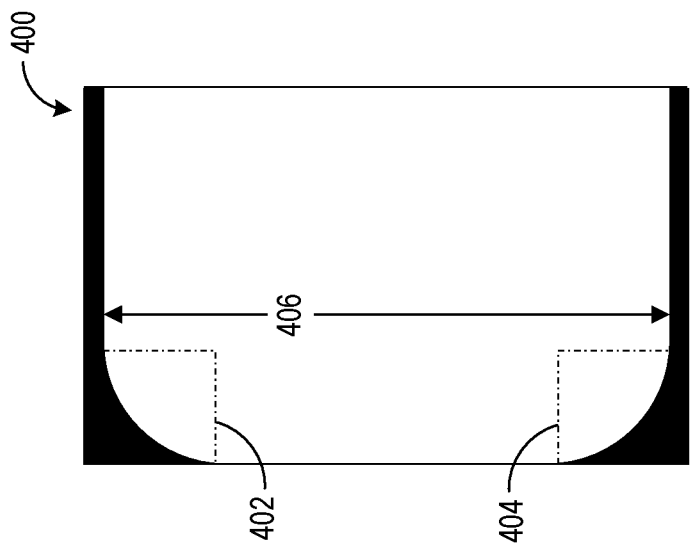

A modification region may be defined independently in a display driver from a line start position, and may be applied by a display driver after image rendering, rather than being rendered as a part of the displayed image itself. As a result, a modification region may be misaligned with an active area of a display after pixel registration. FIGS. 4A-C show an example rectangular display 400 that applies modification regions 402 and 404 to display rounded corners for two of the corners of the display 400. Modification regions 402 and 404 are outlined by dotted square boxes.

Thus, to avoid misalignment between a displayed image and a modification region arising from pixel registration, line offset data may be used to adjust the displayed location of a modification region applied to a displayed image. FIGS.

4A-C show displayed locations of the modification regions 402 and 404 being set based upon line offset data for the display 400. FIG. 4B shows the modification regions 402 and 404 shifted up with the image active area relative to FIG. 4A, while FIG. 4C shows that the modification regions 402 and 404 shifted down with the image active area (with reference to the orientation of the device shown in FIG. 4), thus maintaining alignment with the edges of the image active area.

Figure 5:
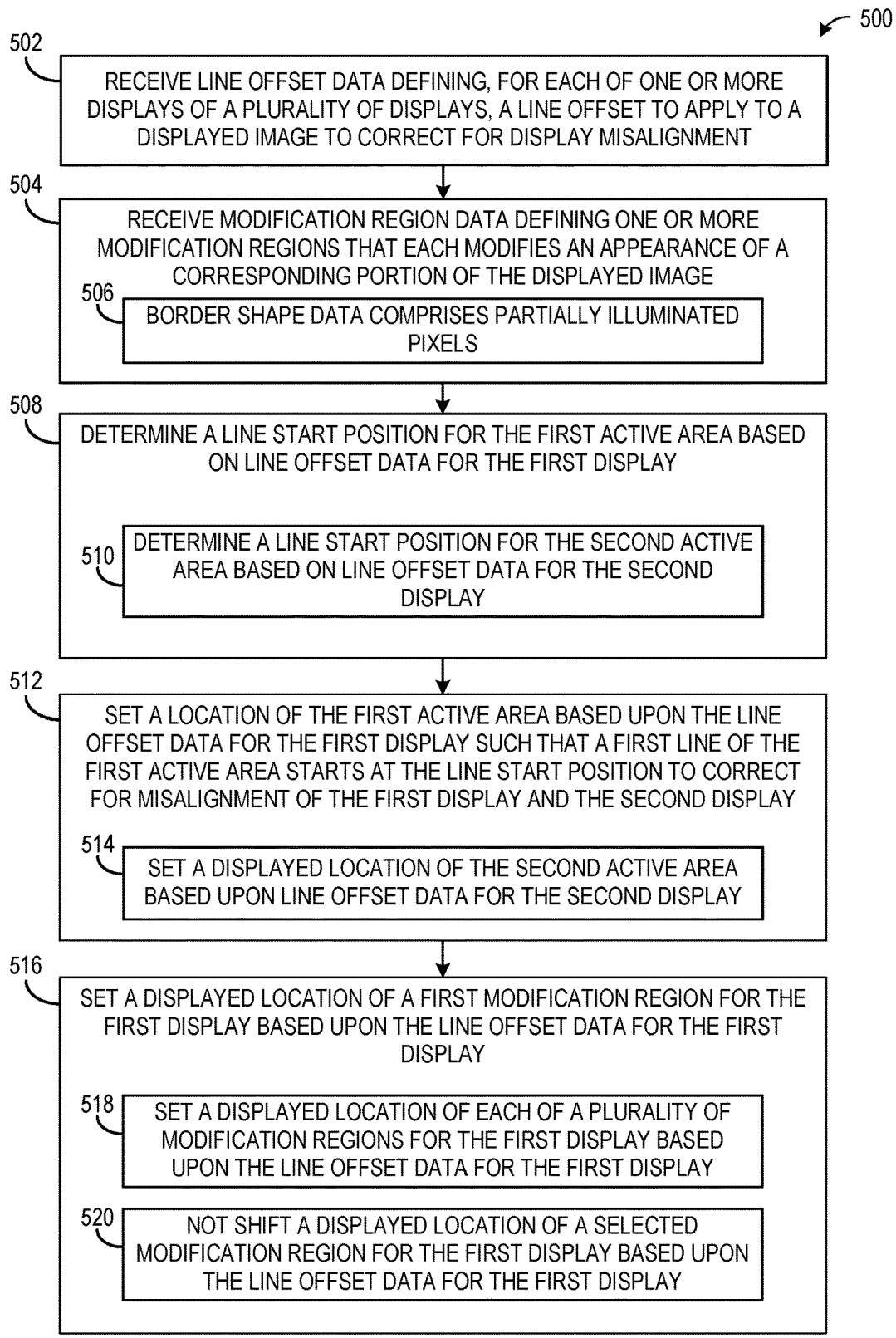
FIG. 5 shows an example method of aligning a modification region on a multi-display device in accordance with pixel registration.

FIG. 5 shows a flow diagram depicting an example method 500 of aligning a modification region with pixel registration on a multi-display device. Method 500 includes, at 502, receiving line offset data defining, for each of one or more displays, a line offset to apply to a displayed image to correct for display misalignment. The line offset data may be determined via a pixel registration process and stored in a storage device on the multi-display device, for example. As such, receiving the line offset data may include obtaining the line offset data from storage on the multi-display device.

Method 500 further includes, at 504, receiving modification region data defining one or more modification regions that each modifies an appearance of a corresponding portion of the displayed image. The modification region data likewise may be stored in a storage device on the multi-display device. The modification region data may include data that modifies an appearance of a corresponding portion of a displayed image, whether a perimeter of the displayed image or an interior portion of a displayed image. As examples, modification regions may include a corner shape for one or more corners of the display (e.g. round corner), or a notch or opening corresponding to the location of an image sensor. The modification region data may, for example, specify pixels not to illuminate. In some examples, a modification region may comprise one or more partially illuminated pixels, as indicated at 506, wherein the partially illuminated pixels may help to give the curvature of the modification region a smoother appearance. Referring briefly to FIG. 4A, modification region 402 and modification region 404 may be created by partially illuminating or not illuminating pixels that are shown in black portions of the dotted square box, while illuminating the remaining pixels in the white portion of the box to display corresponding portions of an image.

Method 500 further includes, at 508, determining a line start position for the first active area based on the line offset data for the first display. Method 500 may also include determining a line start position for the second active area based upon line offset data for the second display, at 510. Continuing, method 500 includes, at 512, setting a displayed location of the first active area based upon the line offset data for the first display, such that a first line of the first active starts at the line start position to thereby correct for misalignment between the first display and the second display. Method 500 further may include, at 514, setting a displayed location of the second active area based upon line start data for the second display. Line start positions for additional displays may be similarly determined.

Method 500 further includes, at 516, setting a displayed location of a first modification region for the first display based upon the line offset data for the first display. In some examples, method 500 includes setting a displayed location of each of a plurality of modification regions for the first display, at 518. Referring briefly to FIG. 4B, where the image active area 406 is shifted up from that shown in FIG. 4A, modification region 402 and modification region 404 may each also be shifted up and set at a displayed location that is based on the line offset data for the display 400. Shifting the modification region may comprise, for example, applying an offset specified by the line start data to each pixel of the modification region, thereby shifting the specified modification to apply to each pixel of the modification region.

In some examples, one or more modification regions may not be tied to line start data. As such, method 500 includes, at 520, not shifting a displayed location of a selected modification region for the first display based upon the line start data, but instead setting the displayed location for the selected modification region without consideration of the line start data. In such examples, whether to align a modification region according to line start data from pixel registration may be a setting that is applied to each modification region. Such a setting may be set by a developer, and in some examples may be modifiable by a user. Thus, where multiple modification regions are applied to an image, some may be adjusted according to pixel registration while others may not be adjusted, based upon a setting for each modification region.

Figure 6A:
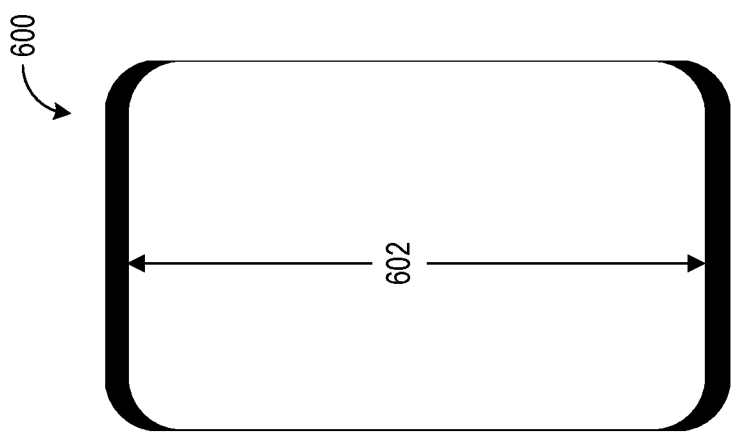
FIGS. 6A-6C show examples of aligning modification regions on a display comprising a backplane with four rounded corners.
Figure 6B:
Figure 6C:
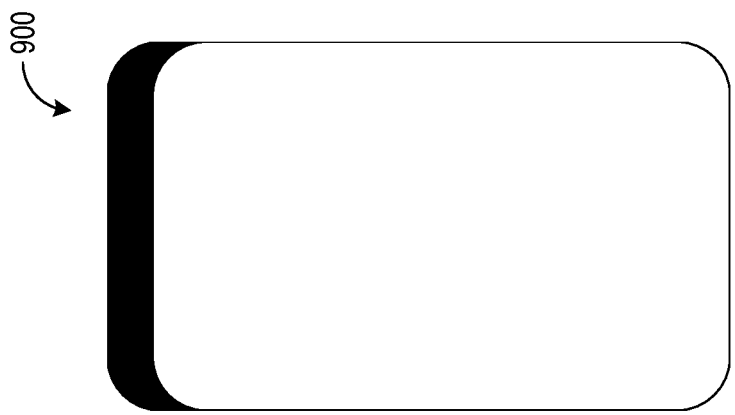

FIGS. 4A-C show examples of modification regions comprising rounded corners implemented on a display with a rectangular backplane. In other examples, a display may comprise a backplane with physically rounded corners. In such examples, modification regions may be used that match the shape of the hardware border, such that the shape of the hardware border is preserved by the modification region when pixel registration is performed. FIGS. 6A-C show examples of a display 600 that has a backplane (e.g. a thin-film transistor backplane) with four rounded corners, and that has modification regions in the form of rounded corners applied to a displayed image. Shifting a line start position due to pixel registration also results in the shifting of the modification regions, as shown in FIGS. 6B and 6C compared to FIG. 6A. While the modification regions match the backplane shapes in this example, modification regions also may be applied that do not match the backplane shapes.

Figure 7C:
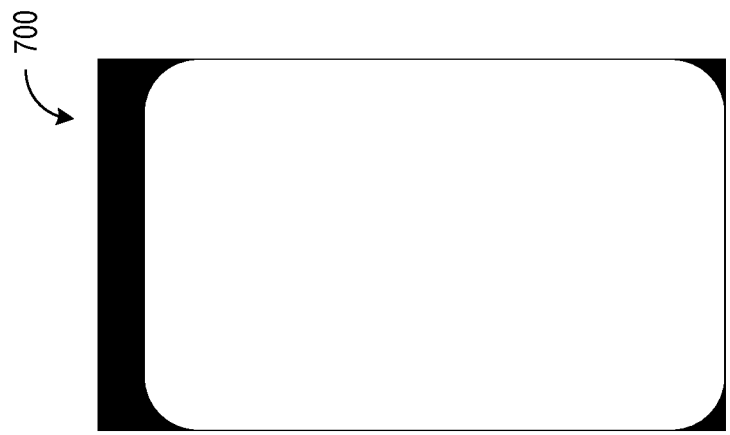
FIGS. 7A-7C show examples of aligning modification regions on a display comprising a rectangular backplane.
Figure 7B:
Figure 7A:
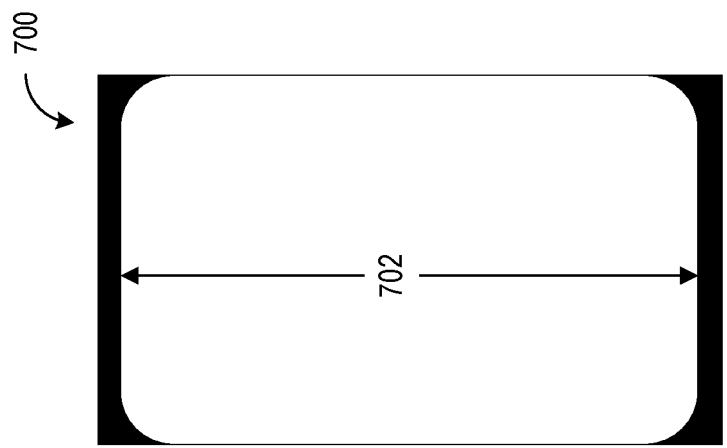
Figure 8C:
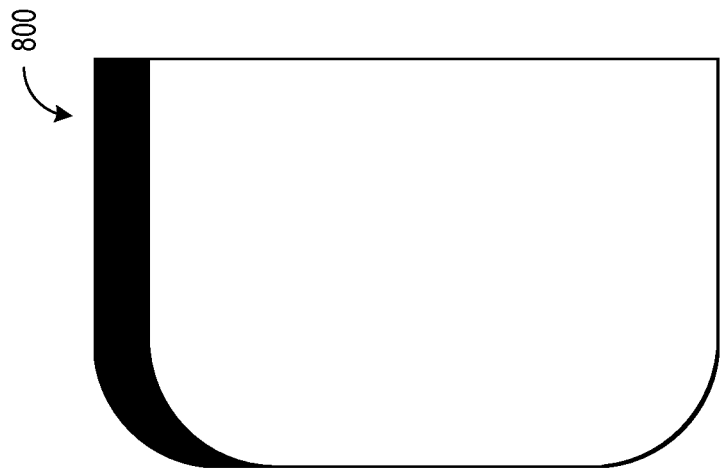
FIGS. 8A-8C show examples of aligning modification regions on a display comprising a backplane with two rounded corners.
Figure 8B:
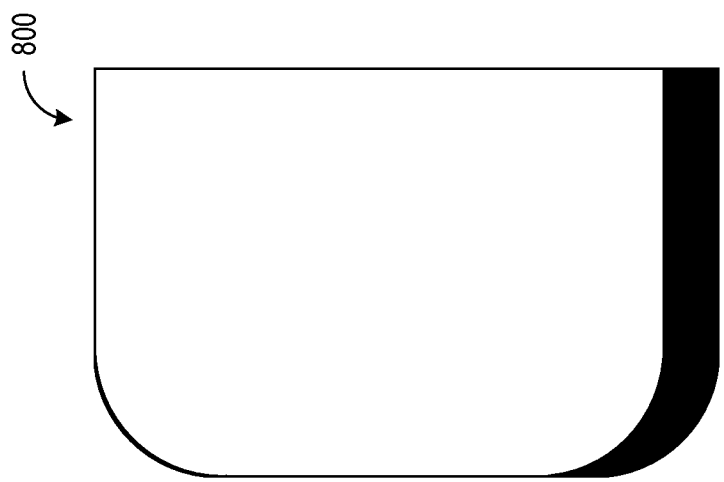
Figure 8A:
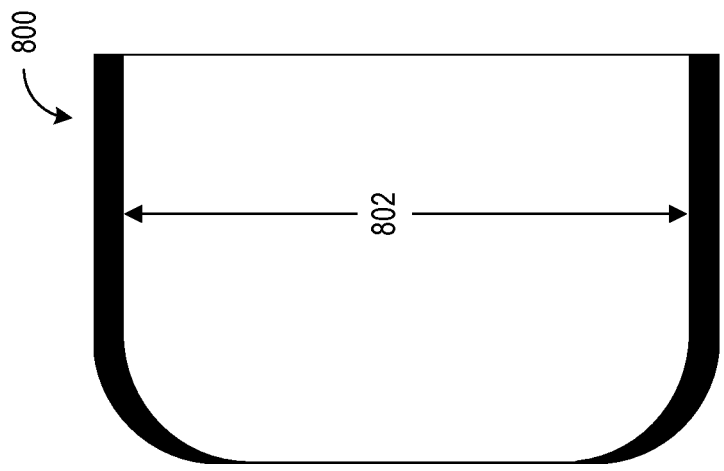

FIGS. 7A-C show a display 700 with modification regions in the form of four curved corners applied on a rectangular display in a similar manner. FIG. 7B shows the four modification regions shifted upwardly, and FIG. 7C shows the four modification regions shifted downwardly. As yet another example, FIGS. 8A-C show examples of a display 800 having a backplane with two rounded corners on the left-hand side, and two non-rounded corners on the right-hand side. Modification regions are applied with shapes that matches those of the backplane. The active area 802 and modification regions may be shifted up (FIG. 8B) or down (FIG. 8C) for alignment of displays.

Figure 9C:
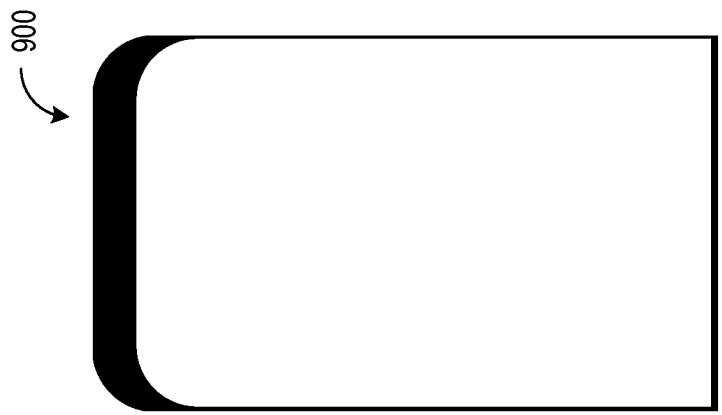
FIGS. 9A-9C show other examples of aligning modification regions on a display comprising a backplane with two rounded corners.
Figure 9B:
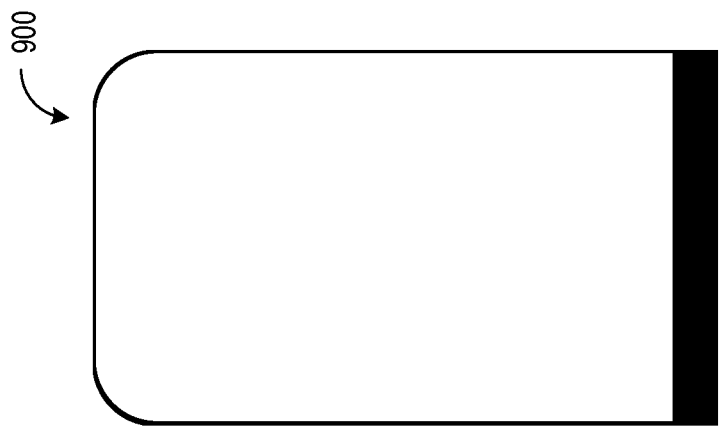
Figure 9A:
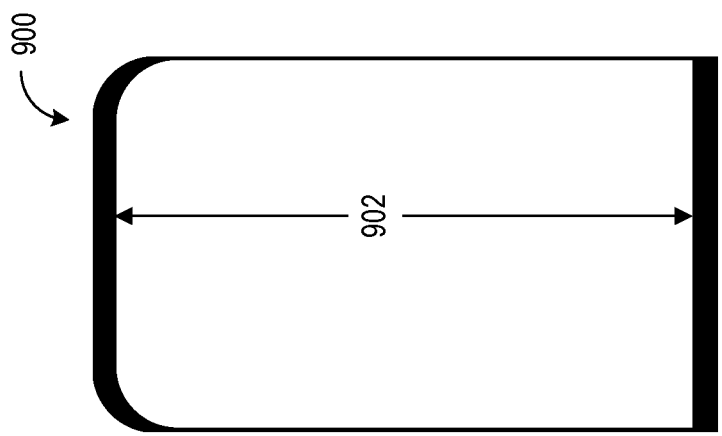

As a further example, FIGS. 9A-C show examples of a display 900 having a backplane shaped with two rounded corners on a top side and two non-rounded corners on a bottom side. Modification regions comprising curved corners that match the backplane corners are applied, and may be shifted up (FIG. 9B) or down (FIG. 9C) in accordance with pixel registration.

Figure 12:
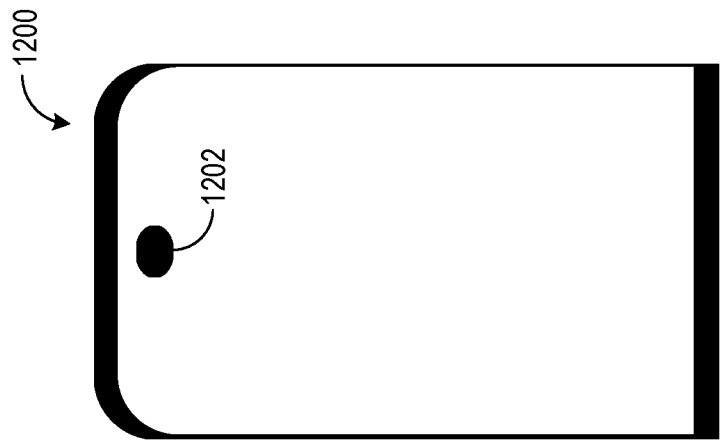
FIGS. 10-12 show other example modification regions on a display.
Figure 11:
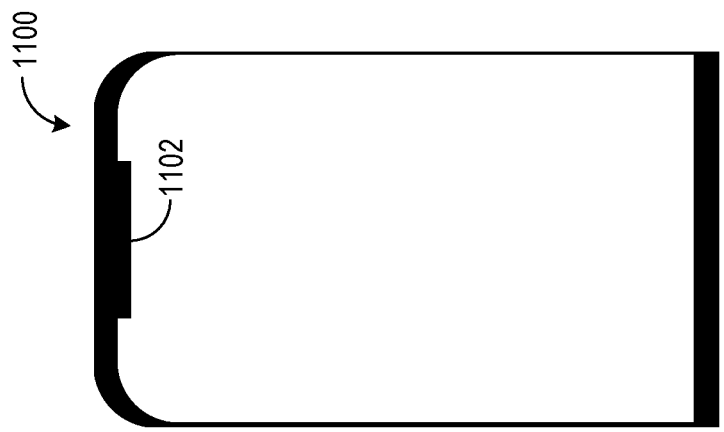
Figure 10:
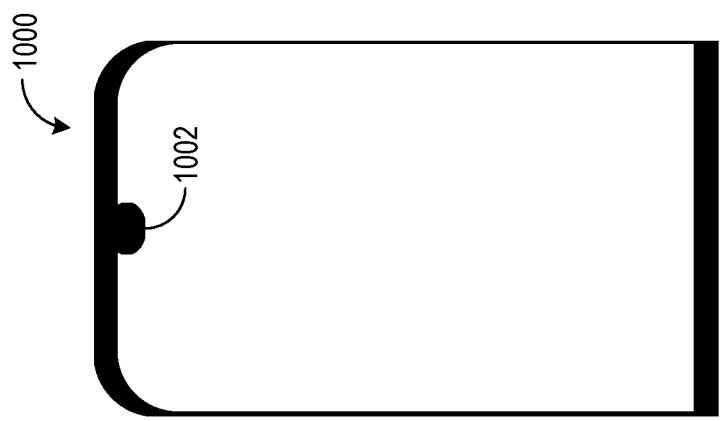

As mentioned above, modification regions may be used to define other features than rounded corners. FIGS. 10 and 11 respectively show displays 1000, 1100 with modification regions 1002, 1102 that each defines a notch in an upper edge of an active area to accommodate a camera and/or other hardware devices. Such a notch may or may not be moved in accordance with pixel registration, depending, for example, upon whether a margin is designed into the modification region to accommodate movement of the active area due to pixel registration. FIG. 12 shows a display 1200 with a modification region 1202 defining an opening in an interior of an active area to accommodate a camera or other hardware. Modification region 1202 likewise may or may not move in accordance with pixel registration.

Figure 13A:
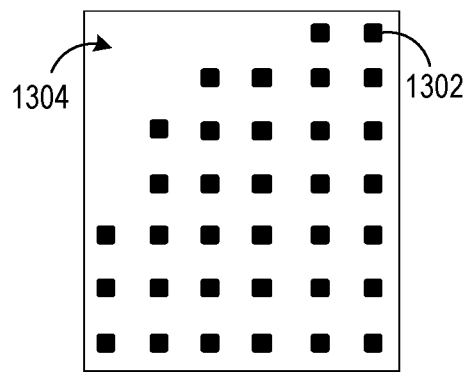
FIG. 13A shows an example arrangement of pixels defining a rounded corner.
Figure 13B:
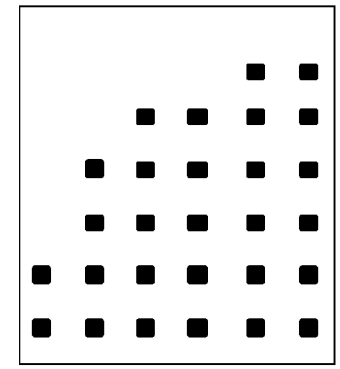
FIG. 13B shows the arrangement of pixels of FIG. 13A shifted down by one row in accordance with pixel registration.

Modification regions may comprise any suitable arrangement of pixels to implement an intended visual appearance. FIG. 13A shows a schematic depiction of an example pattern of pixels to implement a rounded corner. In this figure, dark squares 1302 represent illuminated pixels, and the area 1304 without dark squares represents unilluminated pixels. FIG. 13B shows the round corner shifted down by one row of pixels (e.g. by applying an offset specified by the line start data to each pixel of the modification region), as an example of how the modification region may shift with an image active area in accordance with pixel registration.

Figure 14A:
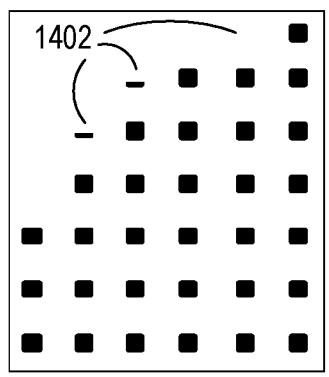
FIG. 14A shows another example arrangement of pixels defining a rounded corner.
Figure 14B:
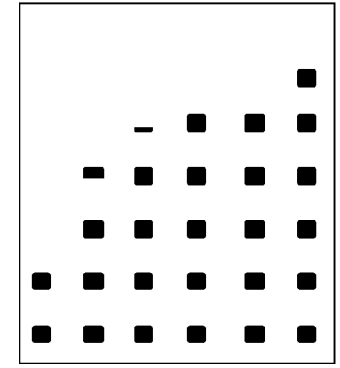
FIG. 14B shows the arrangement of pixels of FIG. 14A shifted down by one row in accordance with pixel registration.

In some examples, turning pixels either on or off in a binary manner to achieve rounding may create the appearance of a rough curve. As such, the appearance a curved modification region may be smoothed by partially illuminating some pixels to create the appearance of a smoother curve. FIG. 14A shows an example of partially illuminated pixels 1402 to smooth a rounded corner, and FIG. 14B shows the modification region shifted down by one row of pixels for pixel registration.

Figure 15:
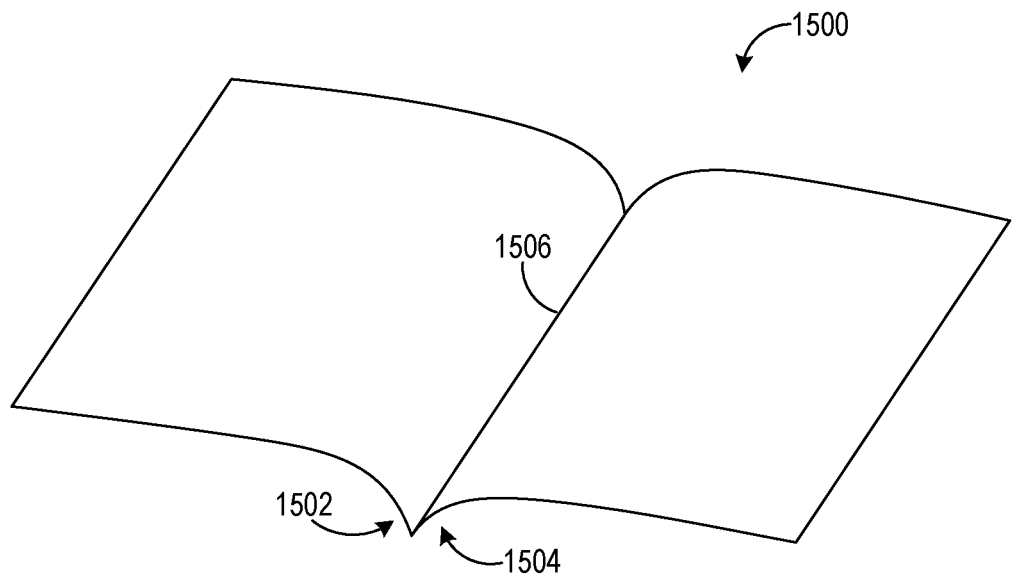
FIG. 15 schematically shows an example dual-display device comprising wraparound edges along a folding spine.
Figure 16:
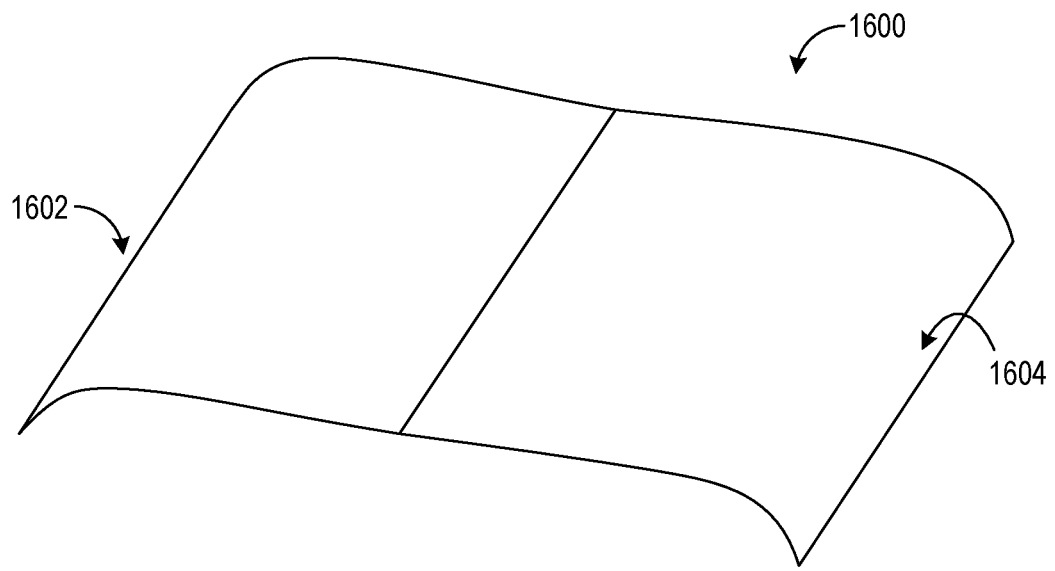
FIG. 16 schematically shows an example dual-display device comprising wraparound outer edges.

In some examples, a display device may comprise a display that is physically curved out of a major plane of the display. For example, a display may wrap around one or more side edges of the display device, allowing content (e.g. notifications) to be displayed at the wraparound edge. FIG. 15 schematically shows an example dual-display device 1500, where each primary display has a wraparound edge 1502, 1504 along the folding spine 1506. In this example, display misalignment may occur both in a vertical and in a horizontal direction, with reference to the orientation shown in the figure. Misalignment in a horizontal direction may cause, for example, words displayed across the two displays to be spaced incorrectly, as letters may not align across the joint in an expected spacing. FIG. 16 shows another example dual-display device 1600, where each primary display has a wraparound edge 1602, 1604 along the outer edge. In this example, notifications may be displayed along the curved outer edge. As such, pixel registration may be used to adjust where such notifications are displayed. In either example, modification regions may be applied, and shifted or not shifted in accordance with pixel registration based upon a setting applied to each modification region.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
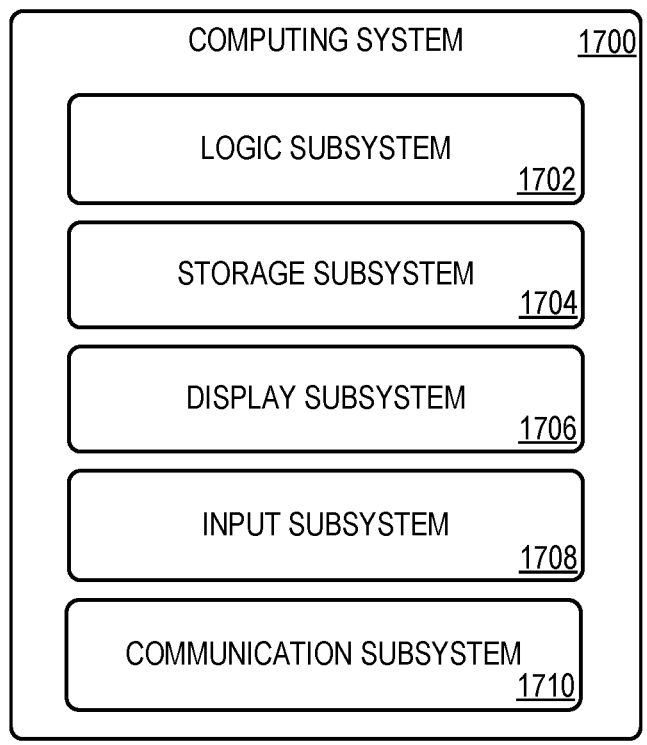
FIG. 17 schematically shows a block diagram depicting an example computing system.

FIG. 17 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices.

Computing system 1700 includes a logic subsystem 1702 and a storage subsystem 1704. Computing system 1700 may optionally include a display subsystem 1706, input subsystem 1708, communication subsystem 1710, and/or other components not shown in FIG. 17.

Logic subsystem 1702 includes one or more physical devices configured to execute instructions. For example, the logic subsystem 1702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1702 may include one or more processors configured to execute software instructions. Additionally or alternatively, the logic subsystem 1702 may include one or more hardware or firmware logic machines configured to execute hardware or firmware instructions. Processors of the logic subsystem 1702 may be single-core or multi-core, and the instructions executed thereon may be configured for sequential, parallel, and/or distributed processing. Individual components of the logic subsystem 1702 optionally may be distributed among two or more separate devices, which may be remotely located and/or configured for coordinated processing. Aspects of the logic subsystem 1702 may be virtualized and executed by remotely accessible, networked computing devices configured in a cloud-computing configuration.

Storage subsystem 1704 includes one or more physical devices configured to hold instructions executable by the logic subsystem 1702 to implement the methods and processes described herein. When such methods and processes are implemented, the state of storage subsystem 1704 may be transformed—e.g., to hold different data.

Storage subsystem 1704 may include removable and/or built-in devices. Storage subsystem 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1704 may include volatile, nonvolatile, dynamic, static, read/write, read-only, random-access, sequential-access, location-addressable, file-addressable, and/or content-addressable devices.

It will be appreciated that storage subsystem 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1702 and storage subsystem 1704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1706 may be used to present a visual representation of data held by storage subsystem 1704. This visual representation may take the form of a graphical user interface (GUI). As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic subsystem 1702 and/or storage subsystem 1704 in a shared enclosure, or such display devices may be peripheral display devices.

When included, input subsystem 1708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1710 may be configured to communicatively couple computing system 1700 with one or more other computing devices. Communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

Another example provides a multi-display device, comprising a plurality of displays, one or more processors, and one or more storage devices storing line offset data defining, for each of one or more displays of the plurality of displays, a line offset to apply to a displayed image to correct for display misalignment, modification region data defining one or more modification regions that each modifies an appearance of a corresponding portion of the displayed image, and instructions executable by the one or more processors to determine a line start position for a first active area based upon line offset data for a first display, set a displayed location of the first active area based upon the line offset data for the first display such that a first line of the first active area starts at the line start position, and set a displayed location of a first modification region for the first display based upon the line offset data for the first display. The instructions may be additionally or alternatively executable to set a displayed location of a second active area based upon line offset data for a second display. The plurality of displays may additionally or alternatively include three or more displays. The first modification region may additionally or alternatively define a curve to apply to a corner of the displayed image. The first modification region may additionally or alternatively define an opening for a camera. The instructions may be additionally or alternatively executable to set a displayed location of each of a plurality of additional modification regions for the first display based upon the line offset data for the first display. The instructions may be additionally or alternatively executable not to shift a displayed location of a second modification region for the first display based upon the line offset data for the first display. The instructions may be additionally or alternatively executable to partially illuminate one or more pixels in the first modification region based upon the line offset data for the first display. The first display may additionally or alternatively include a backplane having rounded corners.

Another example provides, on a multi-display device comprising a plurality of displays, a method comprising receiving line offset data defining, for each of one or more displays of the plurality of displays, a line offset to apply to a displayed image to correct for display misalignment, receiving modification region data defining one or more modification regions that each modifies an appearance of a corresponding portion of the displayed image, determining a line start position for a first active area based upon line offset data for a first display, setting a displayed location of the first active area based upon the line offset data for the first display such that a first line of the first active area starts at the line start position to correct for misalignment of the first display and a second display, and setting a displayed location of a first modification region for the first display based upon the line offset data for the first display. The method may additionally or alternatively include setting a displayed location of a second active area based upon line offset data for the second display. The plurality of displays may additionally or alternatively include three or more displays. The first modification region may additionally or alternatively define a curve to apply to a corner of the displayed image. The first modification region may additionally or alternatively define an opening for a camera. The method may additionally or alternatively include setting a displayed location of each of a plurality of modification regions for the first display based upon the line offset data for the first display. The method may additionally or alternatively include not shifting a displayed location of a second modification region for the first display based upon the line offset data for the first display. The method may additionally or alternatively include partially illuminating one or more pixels in the first modification region based upon the line offset data for the first display.

Another example provides a multi-display device, comprising a plurality of displays, one or more processors, and one or more storage devices storing line offset data defining, for each of one or more displays of the plurality of displays, a line offset to apply to a displayed image to correct for display misalignment, rounded corner data defining one or more rounded corners to apply to the displayed image, and instructions executable by the one or more processors to determine a line start position for a first active area based upon line offset data for a first display, set a displayed location of the first active area based upon the line offset data for the first display such that a first line of the first active area starts at the line start position to correct for misalignment of the first display and a second display, and set a displayed location of a first rounded corner based upon the line offset data for the first display. The instructions may additionally or alternatively be executable to set a displayed location of a second active area based upon line offset data for the second display. The plurality of displays may additionally or alternatively include three or more displays.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A multi-display device, comprising:
   a plurality of displays;
   one or more processors; and
   one or more storage devices storing:
      line offset data defining, for each of one or more displays of the plurality of displays, a line offset to apply to a displayed image to correct for display misalignment,
      modification region data defining one or more modification regions that each modifies an appearance of a corresponding portion of the displayed image, and
      instructions executable by the one or more processors to determine a line start position for a first active area based upon line offset data for a first display, set a displayed location of the first active area based upon the line offset data for the first display such that a first line of the first active area starts at the line start position, and set a displayed location of a first modification region for the first display based upon the line offset data for the first display.

2. The multi-display device of claim 1, wherein the instructions are further executable to set a displayed location of a second active area based upon line offset data for a second display.

3. The multi-display device of claim 1, wherein the plurality of displays comprises three or more displays.

4. The multi-display device of claim 1, wherein the first modification region defines a curve to apply to a corner of the displayed image.

5. The multi-display device of claim 1, wherein the first modification region defines an opening for a camera.

6. The multi-display device of claim 1, wherein the instructions are further executable to set a displayed location of each of a plurality of additional modification regions for the first display based upon the line offset data for the first display.

7. The multi-display device of claim 1, wherein the instructions are executable not to shift a displayed location of a second modification region for the first display based upon the line offset data for the first display.

8. The multi-display device of claim 1, wherein the instructions are executable to partially illuminate one or more pixels in the first modification region based upon the line offset data for the first display.

9. The multi-display device of claim 1, wherein the first display comprises a backplane having rounded corners.

10. On a multi-display device comprising a plurality of displays, a method comprising:
   receiving line offset data defining, for each of one or more displays of the plurality of displays, a line offset to apply to a displayed image to correct for display misalignment,
   receiving modification region data defining one or more modification regions that each modifies an appearance of a corresponding portion of the displayed image,
   determining a line start position for a first active area based upon line offset data for a first display,
   setting a displayed location of the first active area based upon the line offset data for the first display such that a first line of the first active area starts at the line start position to correct for misalignment of the first display and a second display, and
   setting a displayed location of a first modification region for the first display based upon the line offset data for the first display.

11. The method of claim 10, further comprising setting a displayed location of a second active area based upon line offset data for the second display.

12. The method of claim 10, wherein the plurality of displays comprises three or more displays.

13. The method of claim 10, wherein the first modification region defines a curve to apply to a corner of the displayed image.

14. The method of claim 10, wherein the first modification region defines an opening for a camera.

15. The method of claim 10, further comprising setting a displayed location of each of a plurality of modification regions for the first display based upon the line offset data for the first display.

16. The method of claim 10, further comprising not shifting a displayed location of a second modification region for the first display based upon the line offset data for the first display.

17. The method of claim 10, further comprising partially illuminating one or more pixels in the first modification region based upon the line offset data for the first display.

18. A multi-display device, comprising:
   a plurality of displays;
   one or more processors; and
   one or more storage devices storing:
      line offset data defining, for each of one or more displays of the plurality of displays, a line offset to apply to a displayed image to correct for display misalignment,
      rounded corner data defining one or more rounded corners to apply to the displayed image, and
      instructions executable by the one or more processors to:
         determine a line start position for a first active area based upon line offset data for a first display,
         set a displayed location of the first active area based upon the line offset data for the first display such that a first line of the first active area starts at the line start position to correct for misalignment of the first display and a second display, and
         set a displayed location of a first rounded corner based upon the line offset data for the first display.

19. The multi-display device of claim 18, wherein the instructions are further executable to set a displayed location of a second active area based upon line offset data for the second display.

20. The multi-display device of claim 18, wherein the plurality of displays comprises three or more displays.

* * * * *